Sept. 10, 1929.  C. S. BARRELL  1,727,924
CHAIN
Original Filed July 10, 1924

Inventor:
Charles S. Barrell
by Henry T. Williams,
Attorney

Patented Sept. 10, 1929.

1,727,924

UNITED STATES PATENT OFFICE.

CHARLES S. BARRELL, OF BOSTON, MASSACHUSETTS.

CHAIN.

Application filed July 10, 1924, Serial No. 725,151. Renewed January 14, 1929.

The invention to be hereinafter described relates to chains, and more particularly to a link construction suitable for the cross chains of tire chains and for other purposes.

One of the objects of the invention is to provide a link formed of a wire loop having sides seated in opposed grooves of a filler or member, the construction being such that the ends of the wire forming the loop are secured by said member.

The usual cross chains of tire chains are made of links which are so formed that when a cross chain slackens sufficiently and is rolled and twisted in performing its traction function, the chain is liable to kink up, and one or more links will ride upon and overlap adjacent links. When the cross chain thus kinked is again placed under tension, the overlapped links often are so interlocked that they remain in this position and are liable to be broken and are liable to cause serious injury to the tire. Another purpose of the invention, therefore, is to provide a cross chain made of links which are so formed that the cross chain cannot kink up, and thus breaking of the links and injury to the tire from such cause are prevented.

With the aforesaid and other objects in view, the character of the invention may be best understood by reference to the following description of one good form thereof shown in the accompanying drawing.

In the drawing:

Fig. 1 is a transverse section through a tire equipped with a cross chain embodying the invention;

Fig. 2 on an enlarged scale is a section of the filler taken through the median plane of the link;

Figure 1:
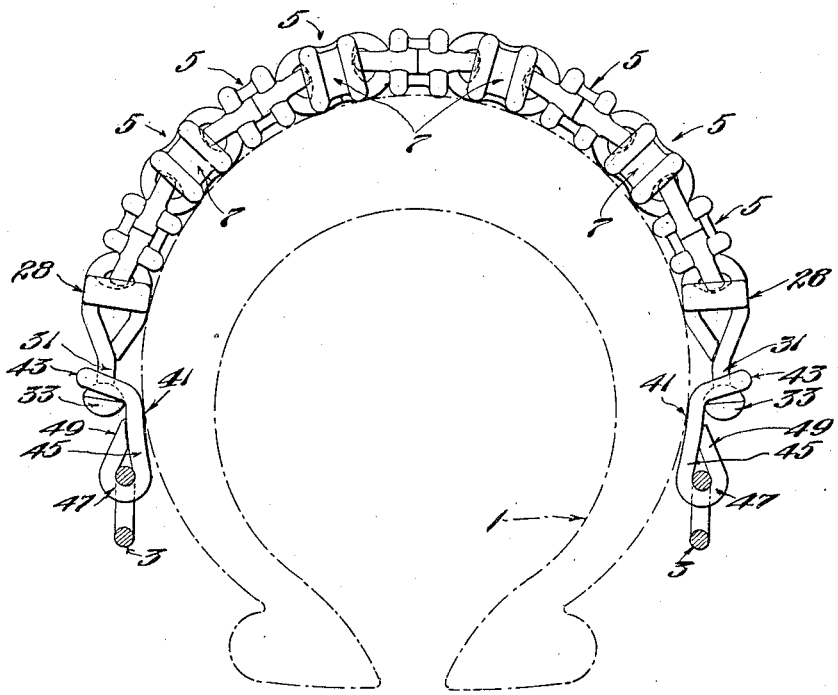
Figure 2:
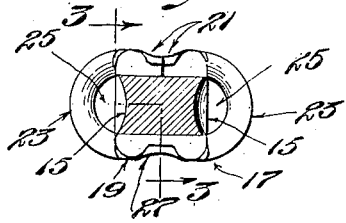
Figure 3:
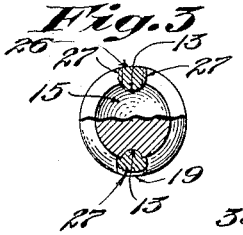
Fig. 3 is a transverse section taken on line 3—3 of Fig. 2.
Figure 4:
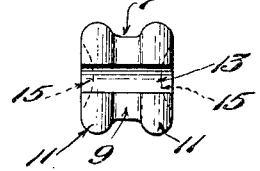
Fig. 4 is a side view of the cylindrical filler or member.
Figure 5:
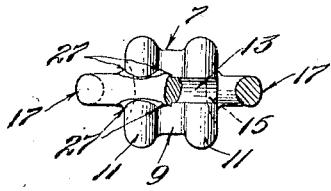
Fig. 5 is a side view of a portion of one of the links and showing the interlocking relation of the wire loop with the filler member.

Referring to the drawing, 1 (Fig. 1) designates a usual tire shoe, and 3, 3 designate links of the usual circular side chains which lie at opposite sides of the tire and to which the cross chains are connected at intervals.

The chain shown herein as embodying the invention, comprises a series of links 5, each of which consists of a filler or member 7 of a rounded character, and in the present instance substantially cylindrical in form. This member may have a circumferential groove 9 between circumferential ribs 11. Formed in the member are a pair of diametrically opposed longitudinal grooves 13 and the member may have cupped ends 15. This member may be made of steel or other suitable material.

A loop 17 is formed of wire of the appropriate length. The side 19 of the loop is seated in one of the grooves 13 of the member 7, and the ends 21 of the loop are bent down and seated into the opposite groove 13 of the member. The wire is of suitable length so that after it is formed into the loop it will have ends 23 which project beyond the ends of the member to provide eyes 25 for receiving the loops of adjacent links. Preferably the wire from which the loop is formed has a nearly flat face 26.

Figure 6:
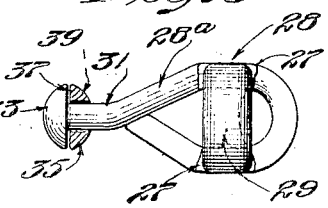
Fig. 6 on an enlarged scale is a side elevation of one of the terminal links.

It is desirable that the loop shall have interlocking relation with the member. To accomplish this, after the opposed sides of the loop have been seated in the grooves 13, they may be subjected to pressure which locally upsets portions 27 (Fig. 6) of the wire and causes the same to be extruded or pressed out to embrace and have interlocking engagement with the circumferential ribs of the cylindrical member 7. Then the link thus formed may be case hardened to increase the durability thereof. By these operations the loop ends 21 are secured to the member and cannot spread apart. Also, the loop and member are so secured that neither can move longitudinally in respect to the other.

When a series of these links is used for a cross chain of a tire chain, at the ends of the series there are provided terminal links 28, each of which comprises a wire loop 28ª having sides seated in opposed grooves in a filler or member 29. The wire may have portions extruded to interlock with the ends of the filler and prevent relative movement of the loop and filler. This filler may be narrower than the fillers described and does not need to have a circumferential groove. An end of the wire projects beyond the loop 28ª to provide a stud 31 having a head 33. A washer 35 may be mounted on the stud and may have a flat face 37 for engagement with the head and a curved face 39.

Connected to each of the terminal links is a hook 41 made of wire formed to provide an eye 43 for receiving the terminal link stud 31. The hook has a shank 45, a reverse bend 47 and an end portion 49 which is bent back so that the tip thereof meets the shank and thus forms an eye for receiving one of the side chain links 3.

The construction is such that the terminal links 28 are swivelled to the hooks 41 and permit the cross chain to roll on the tire and distribute wear on the links of the cross chain. The curved faces of the washers 39 enable the washers to conform to the rounded form of the wire at the hook eyes 43. Thus, the washers reduce the wear on the eyes and the stud heads 33, and also facilitate the swivel movements of the terminal links.

The general cylindrical form of the fillers or members 7 facilitates rotative adjustment of the cross chain on the tire, and said members desirably protect the loops of the links from wear. The sides of the links cannot wear down more than the fillers. The wire loops insure a good grip of the links on the ground with desirable traction effect, and the circumferential ribs of the cylindrical members have a good grip on the ground for resisting skidding.

The surface portions of the wire loop and filler are case hardened to a depth of about one-sixteenth of an inch. Thus in use, after the loop has been worn to this depth, the softer material is reached and the subsequent wear is more rapid. Consequently, it is desirable that the wire loop shall have an outer flattened face. It is more efficient in resisting wear than a wire loop of circular cross-section.

When the links 5 are assembled, the ends 23 of the links may enter the cupped ends of the cylindrical members, and said members will limit relative rocking movements of the links. The construction of the links is such that the relative rocking movements of adjacent links is so restricted that it is impossible for a link to fold over onto and overlap an adjacent link sufficiently to permit kinking of the cross chain.

While the chain has been described more particularly in reference to its use for cross chains of tire chains, it is obvious that it may be employed for other uses.

It will be understood that the invention is not limited to the specific chain described herein, and that various deviations may be made therefrom without departing from the spirit and scope of the appended claims.

What is claimed is:

1. A link comprising a substantially cylindrical member having a circumferential groove and a pair of diametrically opposed longitudinal grooves, and a wire loop having opposed sides in said longitudinal grooves and having interlocking engagement with said circumferential groove.

2. A link comprising a member having a circumferential groove and a pair of opposed longitudinal grooves, and a wire bent into the form of a loop having opposed sides in said longitudinal grooves, and the ends of the wire loop pressed into interlocking engagement with the circumferential groove.

3. A link comprising a rounded member having circumferential ribs and opposed longitudinal grooves, and a wire bent into loop form and having opposed sides pressed into said longitudinal grooves and formed for interlocking engagement with said circumferential ribs.

4. A link comprising a member having a circumferential groove, opposed longitudinal grooves and cupped ends, and a wire loop having opposed sides seated in said longitudinal grooves, said sides having portions extruded for locking engagement with said circumferential groove.

5. A link comprising a member having opposed longitudinal grooves and cupped ends, and a wire loop having opposed sides seated in said grooves and ends projecting beyond said member and forming eyes adapted for connection with other links.

6. A link comprising a member having opposed grooves therein, and a wire loop having a continuous side seated in one of said grooves and end portions parallel to said side and seated in the other groove.

7. In a chain, a series of connected links, each comprising a member of rounded character and having opposed grooves and cupped ends, and a wire loop receiving said member and having opposed sides seated in said grooves, the ends of the loop projecting beyond said member to present eyes, and the ends of adjacent links being interlinked together and adapted to project into the cupped ends of the members.

8. In a chain, connected links, each comprising a wire loop and a filler between the sides of the wire loop and secured thereto, the ends of the loop projecting beyond the filler to present eyes, and the filler having cupped ends for receiving ends of the links.

CHARLES S. BARRELL.